June 13, 1933. W. E. ECCLES 1,914,011
ELECTRICAL FITTING
Filed Sept. 18, 1930
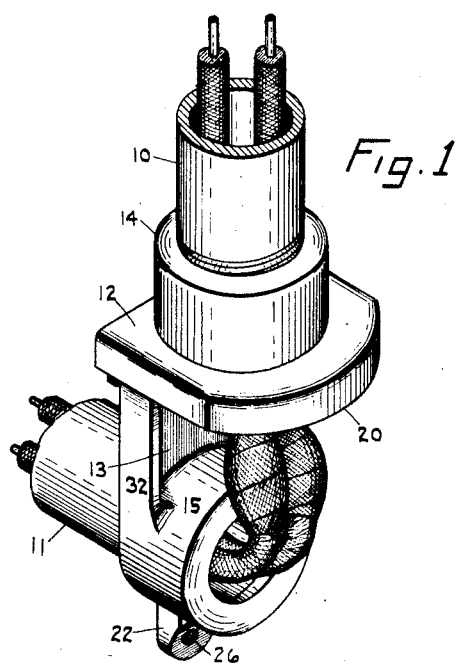
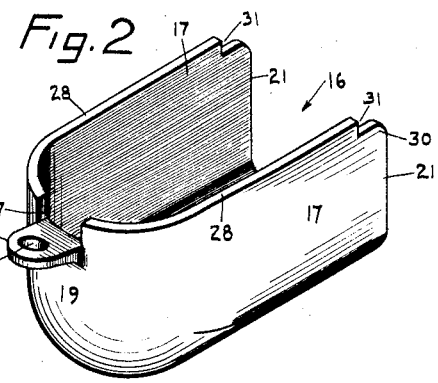
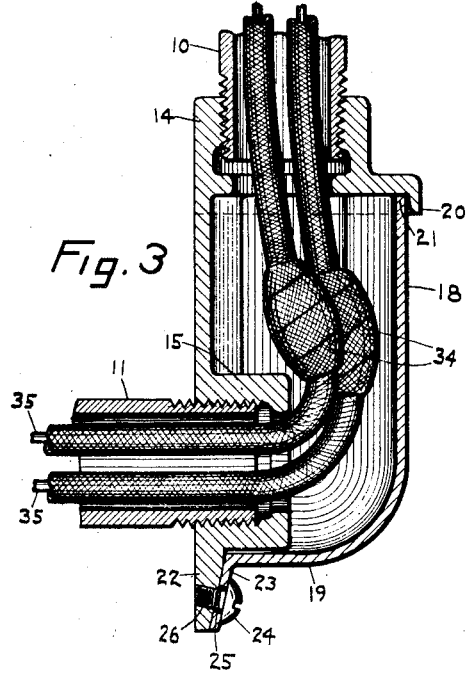
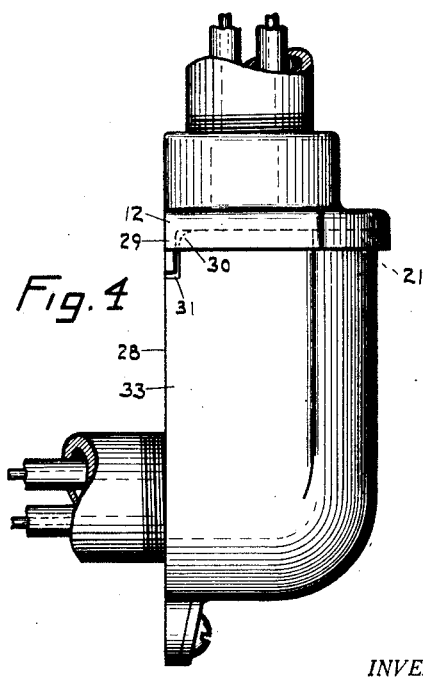
INVENTOR.
WILLIAM E. ECCLES
BY
ATTORNEY

UNITED STATES PATENT OFFICE

WILLIAM E. ECCLES, OF BRISTOL, CONNECTICUT, ASSIGNOR TO NATIONAL ENGINEERING CORPORATION, OF TERRYVILLE, CONNECTICUT, A CORPORATION OF CONNECTICUT

ELECTRICAL FITTING

Application filed September 18, 1930. Serial No. 482,749.

This invention relates to electrical fittings, and more particularly, to an entrance or outside L which is used at the junction of two electrical conduits disposed angularly with relation to each other. Usually, one of the conduits leads to a connection to a power line while the other one extends into the building and leads to the meter.

Heretofore, such fittings have been provided, and have been used, to facilitate the snaking or pulling of an electrical conductor, especially a lead-covered cable, through the conduits by giving access to the point of intersection of the two conduits and permitting a large loop to be formed in the conductor at such intersection. This was done by providing the fitting with a front cover plate which could be removed and through which the loop could extend.

However, even with such fittings provided by the prior art, considerable difficulty is encounterel in pulling through cables, especially heavy or lead-covered cables, and should splices in the wires be required at the junction of the two pipes, the splices would have to be made outside of the L, after which the surplus wire would have to be doubled over and forced back into the L before the cover was replaced.

An object of the present invention is to provide a fitting of the kind referred to wherein free access is given to the interior of the fitting, especially at the point of intersection of the axes of the conduits, so that the work of pulling through the cable is greatly facilitated and so that splicing may be made without leaving surplus wire which must be folded back into the fitting.

This is accomplished in the preferred form of the invention by providing the fitting in two pieces, one having a back and top portion each provided with means for receiving a conduit pipe at an angle with relation to the other conduit pipe, and the other piece constituting the front, sides and bottom of the fitting and being removably mounted on the body and when removed giving free access to the interior of the fitting from the front, sides and bottom.

Other objects and advantages, including those arising from the particular structures of the parts of the fitting, will be hereinafter referred to.

In the accompanying drawing which shows one form of this invention, that at present preferred—

Figure 1 is a perspective view of the body portion of the fitting, showing the ends of the conduits secured thereto and the conductor wires which in this case are spliced, passing through the conduits and located in the interior of the fitting.

Fig. 2 is a perspective view of the cover piece which fits on the body portion shown in Fig. 1.

Fig. 3 is a longitudinal sectional view through the fitting with the body and cover piece connected together, and showing the conduits and conductors as shown in Fig. 1.

Fig. 4 is a view similar to Fig. 3, but shows the fitting and conduits in elevation.

Usually, the conduit 10, which leads to the power line, is vertically disposed as shown in the accompanying drawing, while the conduit 11, which enters the building, is usually horizontally disposed. The fitting of the present invention, which is employed at the junction of the conduits 10 and 11, comprises a body having a top portion 12 and a back portion 13, the latter usually resting against an outside wall of the building. The top 12 has a boss 14 which is threaded to receive the outside conduit 10, while the entrance conduit 11 is threaded in a boss 15. These bosses 14 and 15 may be formed integral with the body and are arranged at right angles to each other so as to accommodate the likewise arranged conduits 10 and 11. Within the scope of this invention, the top portion 12 and back portion 13 of the fitting may be formed of two separately made parts secured together, but preferably they are integral as shown, being a single casting.

Heretofore, fittings such as form the subject-matter of this invention were made with the side and bottom portions permanently connected to the top and back portions and having a removable cover plate covering the hole in the front through which a loop of the snake or cable could extend when leaving the conduit 10 and before entering the conduit 11 to facilitate the operation of pulling the snake or cable through the pipe.

According to the present invention, however, the fitting is so arranged that not only the front but the sides and bottom of the fitting may be removed, thus giving absolute and complete access to the points of connection of the conduits 10 and 11 with the fitting. This condition is illustrated in Fig. 1, from which it will be seen that there is nothing on the body portion of the fitting to interfere with the operation of pulling the cables through the conduits 10 and 11, or with any loop which may be desired to be left in the cable, for the body part of the fitting merely consists of the top and back portions thereof.

Hence, a cover portion 16 of the fitting made in accordance with this invention in its preferred form, includes side portions 17, a front portion 18, and a bottom portion 19, preferably all made integral as shown in Fig. 2, and provision is made for detachably and removably securing the cover piece 16 to the body of the fitting.

This may be done in several different ways, but the arrangement shown in the accompanying drawing is preferred and constitutes an important feature of this invention because of the ease with which the base and cover piece may be made and assembled, and because the joints between the base and the removable cover piece are weatherproof. The provision of such means constitutes an advantageous improvement, both in the narrower aspect of this invention where the sides, front and back of the fitting are removable, and in the broader aspect wherein only some of these portions may be removable.

For the purpose of securing the removable cover piece 16 to the base of the fitting in the form of the invention herein disclosed, the top piece 12 is provided with a peripheral downwardly extending flange 20 forming a recess into which the upper margin 21 of the removable cover piece may extend as shown in Figs. 3 and 4. The flange 20 is made to substantially fit the margin 21 of the cover piece so as to hold the upper end of the cover piece against moving forwardly or laterally, and the flange 20 overlaps the margin 21 sufficiently to prevent rain from beating into the interior of the fitting at its upper end. At its lower end, the back portion 13 of the base is provided with a lug 22 adapted to be engaged by a lug 23 extending downwardly from the bottom 19 of the removable cover piece 16, and face to face direct contact between these lugs 22 and 23 limits the movement of the lower end of the cover piece 16 rearwardly of the body. In addition to this, the lugs 22 and 23 constitute with a headed screw 24 the means for securing the cover piece 16 to the body of the fitting against removal, for the screw 24 extends through an aperture 25 in the lug 23 and enters a threaded hole 26 in the lug 22.

The lug 22 performs the further function of locating the lower end of the cover piece 16 laterally with relation to the back 13 of the base by engaging a notch 27 in the cover plate which it substantially fits.

When mounted in position on the wall of a building, the rear edges 28 of the sides 17 of the removable cover piece 16 would limit, by engaging the wall, the inward movement of the upper end of the cover portion 21. However, the fitting may be spaced more or less from the wall and accordingly, to limit the inward movement of the upper end of the cover piece, the portion of the body at the junction of the top portion 12 and back portion 13 may be provided at each side with a lug 29 to be engaged by the upper rear corners 30 of the sides 17 of the removable cap 16, as shown in Fig. 4, these corners being notched at 31 to receive the lugs 29 in the specific form of the device illustrated.

Preferably, the back portion 13 of the base is provided at each side with forwardly extending flanges 32 which, with the lower half of the boss 15, are overlapped by the rear margins 33 of the sides 17 and bottom 19 of the removable cover piece 16 to prevent rain from beating into the interior of the fitting through the adjoining surfaces of these parts.

To remove the cover piece 16 in the form of the invention herein shown, the screw 24 is removed and then the cover piece is slid downwardly to remove its upper margin 21 from the socket formed by the flanges 20 on the top of the base portion. If adjacent objects should happen to prevent such downward movement of the cover piece 16, the latter may be removed by dropping it slightly and then swinging it outwardly from the bottom using the front flange 20 of the top as a fulcrum. This is permitted by rounding off the corners 30 which engage the lugs 29. Of course, the cover piece 16 may be replaced in the same way.

When the cover piece 16 is removed, as shown in Fig. 1, the entire interior of the fitting is accessible, and should it be necessary to make splices 34 in the conductors 35, no surplus wire, such as would have to be doubled over in the interior of the fitting, need be left, and any soldering and tapping which is required may be done with as much facility as if the wire ends were not in the fitting at all.

Variations and modifications may be made within the scope of this invention and portions of the improvements may be used without others.

Having thus described the invention, what is claimed as new and for which it is desired to obtain Letters Patent, is:—

1. An entrance fitting for electric conduits comprising a body having means for receiving an outside conduit; means for receiving an entrance conduit at an angle with relation to the outside conduit; a cover piece removably mounted on the body and when removed giving free access to the interior of the fitting from the sides and front thereof; interlocking means on the body and on the cover and slidably engaging each other to interlock for holding the cover at one end against movement away from the body in a direction perpendicular thereto; and separate means for holding the cover at the other end against movement away from the body.

2. An entrance fitting for electric conduits comprising a body having means for receiving an outside conduit; means for receiving an entrance conduit at an angle with relation to the outside conduit; a cover piece removably mounted on the body and when removed giving free access to the interior of the fitting from the sides and front thereof; interlocking means on the body and on the cover slidably engaging each other to interlock for holding the cover at one end against movement away from the body in a direction perpendicular thereto; and a single means for holding the cover at the other end against movement away from the body.

3. An entrance fitting for electric conduits comprising a body having means for receiving an outside conduit; means for receiving an entrance conduit at an angle with relation to the outside conduit; a cover piece removably mounted on the body and when removed giving free access to the interior of the fitting from the sides and front thereof; interlocking means on the body and on the cover slidably engaging each other to interlock for holding the cover at one end against movement away from the body in a direction perpendicular thereto; and a single screw for holding the cover at the other end against movement away from the body.

4. An entrance fitting for electric conduits, having permanently connected top and back portions each provided with means for receiving an electric conduit extending at right angles thereto, said top and back portions respectively having downwardly and forwardly extending peripheral flanges, and a cover piece constituting the front and side walls of the fitting removably mounted on the top and back portions and having its side and front top margins overlapped by said peripheral flanges on the top portion and having its side walls overlapping the forwardly extending peripheral flanges on the back portion of the body.

5. An entrance fitting for electric conduits, having permanently connected top and back portions each provided with means for receiving an electric conduit extending at right angles thereto, said top portion having at its front a downwardly extending flange, a removable cover piece having a portion constituting the front of the fitting and having its top margin shaped to fit within and be overlapped by the flange at the front of the top portion, and means at the lower ends of the back portion and the cover piece for securing the same together and holding the top margin of the front of the cover piece in overlapped relation with the said flange on the front of the top portion.

6. An entrance fitting for electric conduits, having permanently connected top and back portions each provided with means for receiving an electric conduit extending at right angles thereto, said top portion having at its front and sides downwardly extending flanges, a removable cover piece having portions constituting the front and sides of the fitting and having its top margin shaped to fit within and be overlapped by the flanges at the front and sides of the top portion, and means at the lower ends of the back portion and the cover piece for securing the same together and holding the top margins of the cover piece in overlapped relation with the said flanges on the front and sides of the top portion.

7. An entrance fitting for electric conduits, having permanently connected top and back portions each provided with means for receiving an electric conduit extending at right angles thereto, said top having at its front and sides downwardly extending flanges, a cover piece constituting the front, sides and bottom of the fitting and having its top margin shaped to fit within and be overlapped by the side flanges on the top portion, and means at the lower end of the back portion cooperating with means on the bottom of the cover piece for securing the cover piece to the back portion and holding the top margin of the cover piece in overlapped relation with the flanges on the top portion.

8. An entrance fitting for electric conduits, having permanently connected top and back portions each provided with means for receiving an electric conduit extending at right angles thereto, said top having at its front and sides downwardly extending flanges, a cover piece constituting the front, sides and bottom of the fitting and having its top margin shaped to fit within and be overlapped by the side flanges on the top portion, a lug extending downwardly from the back portion, and a cooperating lug extending at right angles from the bottom of the cover piece for limiting the movement of the bottom of the cover piece rearwardly with relation to the back portion of the fitting.

9. An entrance fitting for electric conduits, having permanently connected top and back portions each provided with means for receiving an electric conduit extending at right angles thereto, said top having at its front and sides downwardly extending flanges, a cover piece constituting the front, sides and bottom of the fitting and having its top margin shaped to fit within and be overlapped by the side flanges on the top portion, a lug extending downwardly from the back portion, a cooperating lug extending at right angles from the bottom of the cover piece for limiting the movement of the bottom of the cover piece rearwardly with relation to the back portion of the fitting, and a screw passing through an aperture in said lug on the cover piece and threaded in a hole in the said lug on the back portion for securing the cover piece to the back portion and holding the top margin of the cover piece in overlapped relation with the said flanges on the top portion of the fitting.

10. An entrance fitting for electric conduits, having permanently connected top and back portions each provided with means for receiving an electric conduit extending at right angles thereto, said top having at its front and sides downwardly extending flanges, a cover piece constituting the front, sides and bottom of the fitting and having its top margin shaped to fit within and be overlapped by the side flanges on the top portion, a lug extending downwardly from the back portion, and a cooperating lug extending at right angles from the bottom of the cover piece for limiting the movement of the bottom of the cover piece rearwardly with relation to the back portion of the fitting, the bottom of the cover piece being notched and fitting the lug on the back portion to locate the cover piece laterally with respect to the latter.

11. An entrance fitting for electric conduits, having permanently connected top and back portions each provided with means for receiving an electric conduit extending at right angles thereto, said top having at its front and sides downwardly extending flanges, a cover piece constituting the front, sides and bottom of the fitting and having its top margin shaped to fit within and be overlapped by the side flanges on the top portion, a lug extending downwardly from the back portion, a cooperating lug extending at right angles from the bottom of the cover piece for limiting the movement of the bottom of the cover piece rearwardly with relation to the back portion of the fitting, and a lug on the top portion engaged by the cover piece for limiting the movement of the upper portion of the cover piece rearwardly with relation to the top and back portions of the fitting.

12. An entrance fitting for electric conduits, having permanently connected top and back portions each provided with means for receiving an electric conduit extending at right angles thereto, said top portion having at its front and sides downwardly extending flanges, a removable cover piece having portions constituting the front and sides of the fitting and having its top margin shaped to fit within and be overlapped by the flanges at the front and sides of the top portion, means at the lower ends of the back portion and the cover piece for securing the same together and holding the top margins of the cover piece in overlapped relation with the said flanges on the front and sides of the top portion, and lugs at the junction of the top and back portions for engaging the cover piece to limit the movement of the latter rearwardly with relation to the former.

13. A fitting for electric conduits including a body having substantially open sides and front; and a cover piece, constituting side and top walls for the body, fitting in a socket at one end of the body and at the other end being secured to the body, said cover piece being removable to give free access to the interior of the body.

14. A fitting for electric conduits comprising a body having substantially open sides and front; a cover piece, constituting side and top walls for the body, fitting in a socket in one end of the body; and a screw for securing the other end of the cover piece to the body.

15. A fitting for electric conduits comprising a body having substantially open sides and front, said body having top and back portions each provided with means for receiving an electric conduit extending at right angles thereto; a cover piece constituting side and front walls for the body and removably secured to the body; and a skirt on the top portion of the body overlapping the top portion of the cover piece.

16. A fitting for electrical conduit comprising a body having permanently connected top and back portions, the top portion being provided with means for receiving an electrical conduit; a downwardly extending flange on the top portion; a removable cover piece having a portion constituting the front of the fitting and having its top margin shaped to fit within and be overlapped by the flange on the top portion; and means at the lower ends of the back portion and the cover piece for securing the same together and holding the top margin of the cover piece in overlapped relation with said flange on the top portion.

17. A fitting for electrical conduit comprising a body having permanently connected top and back portions, the top portion being provided with means for receiving an electrical conduit and having a downwardly extending flange; a cover piece constituting the front, sides and bottom of the fitting and having its top margin shaped to fit within and be overlapped by the flange on the top portion; and means on the back portion and on the cover piece for limiting rearward movement of the cover piece relative to the back portion and for securing the cover piece to the back portion and for holding the top margin of the cover piece in overlapped relation with the flange on the top portion.

18. A fitting for electrical conduit comprising a body having permanently connected top and back portions, the top portion being provided with means for receiving an electrical conduit and having a downwardly extending flange; a cover piece constituting the front, sides and bottom of the fitting and having its top margin shaped to fit within and be overlapped by the flange on the top portion; means on the back portion and on the cover piece for limiting rearward movement of the cover piece relative to the back portion and for securing the cover piece to the back portion and for holding the top margin of the cover piece in overlapped relation with the flange on the top portion; and a boss on said back portion for locating and supporting a conductor, which passes through the conduit, in spaced relation relative to the back portion and to the cover piece.

Signed at Terryville, in the county of Litchfield, and State of Connecticut, this 25th day of August, 1930.

WILLIAM E. ECCLES.

CERTIFICATE OF CORRECTION.

Patent No. 1,914,011.                                                            June 13, 1933.

WILLIAM E. ECCLES.

It is hereby certified that error appears in the printed specification of the above numbered patent requiring correction as follows: Page 4, lines 85 and 93, claims 13 and 14 respectively, for "top" read "front"; and that the said Letters Patent should be read with these corrections therein that the same may conform to the record of the case in the Patent Office.

Signed and sealed this 22nd day of August, A. D. 1933.

M. J. Moore.

(Seal)                                                                      Acting Commissioner of Patents.